(12) United States Patent
Burgess et al.

(10) Patent No.: US 7,435,762 B2
(45) Date of Patent: Oct. 14, 2008

(54) FIRE RESISTANT FOAM AND FOAM PRODUCTS, METHOD AND DISPERSIONS FOR MAKING SAME

(75) Inventors: James H. Burgess, Greenville, SC (US); Sammie J. Glorioso, Jr., Ridgeland, MS (US)

(73) Assignee: IP Rights, LLC, Birmingham, AL (US)

( * ) Notice: Subject to any disclaimer, the term of this patent is extended or adjusted under 35 U.S.C. 154(b) by 578 days.

(21) Appl. No.: 10/239,964

(22) PCT Filed: Mar. 26, 2001

(86) PCT No.: PCT/US01/09626

§ 371 (c)(1),
(2), (4) Date: Sep. 26, 2002

(87) PCT Pub. No.: WO01/72863

PCT Pub. Date: Oct. 4, 2001

(65) Prior Publication Data

US 2004/0122119 A1    Jun. 24, 2004

Related U.S. Application Data

(60) Provisional application No. 60/192,231, filed on Mar. 27, 2000.

(51) Int. Cl.
*C08J 9/14* (2006.01)
(52) U.S. Cl. .......................... 521/99; 521/79; 521/131; 521/170
(58) Field of Classification Search .................. 521/79, 521/99, 131, 170
See application file for complete search history.

(56) References Cited

U.S. PATENT DOCUMENTS

| | | | |
|---|---|---|---|
| 1,137,373 A | 4/1915 | Aylsworth | |
| 3,323,869 A | 6/1967 | Olstowski et al. | |
| 3,574,644 A | 4/1971 | Olstowski et al. | |
| 4,091,083 A | 5/1978 | Hirshvogel et al. | |
| 4,094,951 A | 6/1978 | Ishikawa et al. | |
| 4,146,401 A | 3/1979 | Yamada et al. | |
| 4,244,934 A | 1/1981 | Kondo et al. | |
| 4,327,194 A * | 4/1982 | Chandalia et al. | 521/99 |
| 4,698,369 A | 10/1987 | Bell | |
| 4,722,945 A | 2/1988 | Wood et al. | |
| 4,795,763 A | 1/1989 | Gluck et al. | |
| 4,895,713 A | 1/1990 | Greinke et al. | |
| 4,915,925 A | 4/1990 | Chung | |
| 4,946,892 A | 8/1990 | Chung | |
| 4,977,194 A | 12/1990 | Haas et al. | |
| 5,023,280 A | 6/1991 | Haas et al. | |
| 5,130,199 A | 7/1992 | Howard | |
| 5,137,930 A | 8/1992 | Soukup | |
| 5,149,722 A | 9/1992 | Soukup | |
| 5,169,876 A | 12/1992 | Heitmann et al. | |
| 5,173,515 A | 12/1992 | von Bonin et al. | |
| 5,192,607 A | 3/1993 | Soukup | |
| 5,409,961 A | 4/1995 | Green | |
| 5,444,101 A * | 8/1995 | De Vos et al. | 521/131 |
| 5,519,065 A * | 5/1996 | Vos et al. | 521/131 |
| 5,531,454 A | 7/1996 | Borneby | |
| 5,582,781 A | 12/1996 | Hayward | |
| 5,605,940 A | 2/1997 | Skowronski et al. | |
| 5,650,448 A | 7/1997 | Wallace et al. | |
| 5,660,926 A | 8/1997 | Skowronski et al. | |
| 5,719,199 A | 2/1998 | Wallace et al. | |
| 5,723,506 A | 3/1998 | Glorioso et al. | |
| 5,741,827 A | 4/1998 | Chakrabarti et al. | |
| 5,760,115 A | 6/1998 | Okisaki et al. | |
| 5,830,319 A | 11/1998 | Landin | |
| 5,885,479 A | 3/1999 | Chakrabarti et al. | |
| 5,925,687 A | 7/1999 | Guettes et al. | |
| 5,942,561 A | 8/1999 | Okisaki et al. | |
| 5,952,248 A | 9/1999 | Horton | |
| 5,955,386 A | 9/1999 | Horton | |
| 5,968,669 A | 10/1999 | Liu et al. | |
| 5,981,072 A | 11/1999 | Mercuri et al. | |
| 5,985,452 A | 11/1999 | Mercuri | |
| 6,017,633 A | 1/2000 | Mercuri | |
| 6,017,987 A | 1/2000 | Okisaki | |
| 6,362,242 B1 | 3/2002 | Gluck et al. | |
| 6,384,094 B1 | 5/2002 | Gluck et al. | |
| 6,414,041 B1 | 7/2002 | Gluck et al. | |

FOREIGN PATENT DOCUMENTS

| | | |
|---|---|---|
| EP | 0 464 204 | 1/1992 |
| EP | 0 889 082 | 1/1999 |
| GB | 2168706 A | 6/1998 |
| JP | 01-292041 | 11/1989 |
| JP | 02-194051 | 7/1990 |
| JP | 02-248461 | 10/1990 |
| JP | 10-502415 | 3/1998 |
| JP | 2002-532597 | 10/2002 |
| WO | 95/15355 | 6/1995 |

(Continued)

*Primary Examiner*—John Cooney
(74) *Attorney, Agent, or Firm*—Volpe and Koenig, P.C.

(57) ABSTRACT

A synthetic polymer foam is produced which incorporates fine particles of expandable graphite which surprisingly impart excellent fire resistant properties to the foam, particularly to foam made with a non-halogenated hydrocarbon as the primary blowing agent. For best results, the foam is produced through mixing the constituent materials, including the expandable graphite using a screw extruder. The foam can also be produced by creating a graphite/polyol or graphite/isocyanate dispersion in an extruder then mixing the remaining components in a conventional batch mixing or high pressure spraying process. Alternatively, conventional mixing can be used for the entire process, but use of a screw extruder in whole or in part is preferred.

18 Claims, 9 Drawing Sheets

FOREIGN PATENT DOCUMENTS

| WO | 96/20966 | 7/1996 |
| WO | 96/20966 | 11/1996 |
| WO | 99/16817 | 4/1999 |
| WO | 00/06635 | 2/2000 |
| WO | 00/29471 | 5/2000 |
| WO | 00/35999 | 6/2000 |

* cited by examiner

| CHEMICAL (Extruder Location) | PRODUCT | Example 1 | | |
|---|---|---|---|---|
| | | PBW | % | LBS. |
| Isocyanate (C2/C6) | Bayer | 211.05 | 58.584 | 50.89 |
| Polyol (C9) | Stepan | 100 | 27.759 | 24.11 |
| Expandable Graphite | N/A | 0 | 0.000 | 0.00 |
| Fire Retardant (C9) | Antiblaze 80 | 10 | 2.776 | 2.41 |
| Blowing Agent (C8) | Pentane | 10.0 | 2.776 | 2.41 |
| Blowing Agent (C9) | Pentane | 20.0 | 5.552 | 4.82 |
| Surfactant (C2/C6) | Goldsmidth | 1.0 | 0.278 | 0.24 |
| Surfactant (C7) | Goldsmidth | 2 | 0.555 | 0.48 |
| Water (C9) | | 1 | 0.278 | 0.24 |
| K Octoate (120) | HEX-CEM | 4.00 | 1.110 | 0.96 |
| Amine (120) | Polycat 18 | 0.08 | 0.022 | 0.02 |
| Acetate (120) | Polycat 46 | 1.12 | 0.311 | 0.27 |
| Totals | | 360.2 | 100 | 86.9 |

Fig. 3

| CHEMICAL (Extruder Location) | PRODUCT | Example 2 | | | Example 3 | | | Example 4 | | |
|---|---|---|---|---|---|---|---|---|---|---|
| | | PBW | % | LBS. | PBW | % | LBS. | PBW | % | LBS. |
| Isocyanate (C2/C6) | Bayer | 204.61 | 56.552 | 49.12 | 204.61 | 54.737 | 47.55 | 204.61 | 52.356 | 45.48 |
| Polyol (C9) | Stepan | 100 | 27.639 | 24.01 | 100 | 26.751 | 23.24 | 100 | 25.588 | 22.23 |
| Exp. Graphite (C1/C4) | GG 160-80-N | 18 | 4.975 | 4.32 | 30 | 8.025 | 6.97 | 47 | 12.026 | 10.45 |
| Fire Retardant | N/A | 0 | 0.000 | 0.00 | 0 | 0.000 | 0.00 | 0 | 0.000 | 0.00 |
| Blowing Agent (C8) | Pentane | 10.0 | 2.764 | 2.40 | 10.0 | 2.675 | 2.32 | 10.0 | 2.559 | 2.22 |
| Blowing Agent (C9) | Pentane | 20.0 | 5.528 | 4.80 | 20.0 | 5.350 | 4.65 | 20.0 | 5.118 | 4.45 |
| Surfactant (C2/C6) | Goldsmidth | 1.0 | 0.276 | 0.24 | 1.0 | 0.268 | 0.23 | 1.0 | 0.265 | 0.22 |
| Surfactant (C7) | Goldsmidth | 2 | 0.535 | 0.48 | 2 | 0.535 | 0.46 | 2 | 0.512 | 0.44 |
| Water (C9) | | 1 | 0.276 | 0.24 | 1 | 0.268 | 0.25 | 1 | 0.256 | 0.22 |
| K Octoate (120) | HEX-CEM | 4.00 | 1.106 | 0.96 | 4.00 | 1.070 | 0.93 | 4.00 | 1.024 | 0.89 |
| Amine (120) | Polycat 18 | 0.08 | 0.022 | 0.02 | 0.08 | 0.021 | 0.02 | 0.08 | 0.020 | 0.02 |
| Acetate (120) | Polycat 46 | 1.12 | 0.310 | 0.27 | 1.12 | 0.300 | 0.26 | 1.12 | 0.287 | 0.25 |
| Totals | | 361.81 | 100 | 86.86 | 373.8 | 100 | 86.88 | 390.8 | 100 | 86.87 |

Fig. 4

| FOAM CHARACTERISTICS | | | | |
|---|---|---|---|---|
|  | Example 1 | Example 2 | Example 3 | Example 4 |
| Density (lbs./cu. ft.) | 1.89 | 1.90 | 1.93 | 1.95 |
| Burn Test Results | | | | |
| Type of Smoke | Thick Black | Light Opaque | Light Opaque | Light Opaque |
| Self-Extinguishing | No | Yes | Yes | Yes |
| Protective Char Formed | No | Yes | Yes | Yes |

Fig. 5

| PREFERRED DISPERSION FORMULATIONS | | | | |
|---|---|---|---|---|
| Component | Polyol Dispersion | | ISO Dispersion | |
|  | PBW | Range | PBW | Range |
| Isocyanate (MRP, Bayer) | 0 |  | 241 | ±10 |
| Polyester Polyol (Stepan 2352) | 100.00 | ±5 | 0 |  |
| Exp. Graphite (160-80-N, Graph-Tech Inc) | 15.00 | ±1.0 | 15.00 | ±1.0 |
| Exp. Graphite (160-80-N, Graph-Tech Inc) or Carbon Black | 15.00 | ±1.0 | 15.00 | ±1.0 |
| Dispersing Agent (Pelron 344, ethoxylated phenol) | 3.50 | ±0.5 | 3.50 | ±0.5 |
| Other Non-reactive Ingredients | 0 | +50 | 0 | +100 |

Fig. 10

| Extruder Made Isocyanurate Foam |||||
|---|---|---|---|
| Formulation Examples | Ex. 5 | Ex. 6 | Ex. 7 |
| Component | PBW | PBW | PBW |
| Isocyanate (MRP, Bayer) | 219.00 | 241.00 | 231.00 |
| Polyester Polyol (Stepan 2352) | 100.00 | 100.00 | 100.00 |
| Expandable Graphite (GG160-80-N, Graph-Tech Inc) | 0.00 | 31.20 | 20.00 |
| Carbon Black (Cabot Ind.) | 0.00 | 0.00 | 15.00 |
| Phosphate (Antiblaze 80, Albright & Wilson) | 10.00 | 15.00 | 7.50 |
| Brominate-Ester (Pelron, Ele Corp.) | 10.00 | 7.50 | 7.50 |
| 50/50 Blend Iso-Pentane/Cyclopentane (Exxon) | 26.00 | 26.00 | 28.00 |
| 134-a, HFC (Dupont) | 0.00 | 3.50 | 2.00 |
| Surfactant (Goldsmidth 8457, 8469) | 1.40 | 2.00 | 2.50 |
| Dispersing Agent (Pelron 344, Ele Corp.) | 0.00 | 2.90 | 2.50 |
| WATER | 0.00 | 0.75 | 0.50 |
| Pottasium Octoate (HexCem 977 Mooney Chemicals) | 5.00 | 6.00 | 6.00 |
| P-5, Amine (Polycat 5, Air Products) | 0.15 | 0.12 | 0.12 |
| Pottasium Acetate (Pelron Inc) | 1.45 | 1.60 | 1.60 |

Fig. 6

| FOAM CHARACTERISTICS | | | | | |
|---|---|---|---|---|---|
| | Example 5 | Example 6 | Example 7 | Prior Art* Foam I | Prior Art** Foam II |
| K-Factor (initial) | 0.163 | 0.163 | 0.154 | | |
| (10 day) | | 0.178 | 0.156 | | |
| (30 day) | 0.18 | 0.178 | 0.157 | 0.18 | 0.17 |
| Closed Cell % | 92.4 | 90.5 | 88.9 | 89.5 | 94 |
| Friability % Wt. Loss | 2.5 | 8.9 | 37.8 | | 6.5 |
| Core Density (lbs./cu. ft.) | 1.89 | 1.85 | 1.92 | 1.75 | 1.73 |
| Cold Box % Change (7 day) | 0.34 | No Change | 0.33 | | 0.33 |
| Humid. Aging % Change MD (7 day) | 0.85 | 0.22 | No Change | | 0.55 |
| Humid. Aging % Change XMD (7 day) | 0.9 | 0.25 | No Change | | 0.45 |
| Compressive Strength (psi) | 20.6 | 24.6 | 21.6 | 24.2 | 20.1 |
| Factory Mutual Class 1 | No | Yes | Pending | No | Yes |

\* Made with Iso-Pentane/Cyclopentane Blend as Primary Blowing Agent
\*\* Made with (HCFC-141b) as Primary Blowing Agent

Fig. 7

| PREFERRED BOARDSTOCK FORMULATIONS | | | | |
|---|---|---|---|---|
| Component | PBW | Min | Max | Pounds |
| Isocyanate (MRP, Bayer) | 241.33 | 191 | 400 | 551.16 |
| Polyester Polyol (Stepan 2352) | 100.00 | 75 | 125 | 228.38 |
| Expandable Graphite Particles < 200μ ave. size (Graph-Tech Inc) | 15.57 | 10.57 | 20.57 | 35.56 |
| Expandable Graphite Particles < 200μ ave. size (Graph-Tech Inc) or Carbon Black | 15.57 | 10.57 | 20.57 | 35.56 |
| Phospate/Phosphate Blends (Antiblaze 80, Albright & Wilson) | 15.00 | 10 | 35 | 34.26 |
| Brominated-Ester (Pelron) | 7.50 | 0 | 10 | 17.13 |
| Additional Fire Retardants | 22.5 | 10 | 45 | 51.39 |
| Halogenated Hydrocarbon (134-a, HFC, DuPont) | 3.50 | | 4.5 | 7.99 |
| Non-Halogenated Hydrocarbon (Pentane, Iso-Cyclopentane Blends, Exxon) | 26.00 | 16 | 36 | 59.38 |
| Surfactant (8469 Goldsmidth) | 2.00 | 1 | 4 | 4.57 |
| Dispersing Agent (Pelron 344) | 2.90 | 0 | 4.4 | 6.62 |
| Foaming Agent (WATER) | 0.75 | 0 | 1.5 | 1.71 |
| Pottasium Octoate | 6.00 | 3 | 9 | 13.70 |
| P-5, Amine (Polycat 5, Air Products) | 0.12 | 0.07 | 0.17 | 13.70 |
| Pottasium Acetate | 1.62 | 0.87 | 2.37 | 3.70 |
| Catalysts | 7.74 | 3.94 | 11.54 | 31.1 |
| Other Ingredients | 0 | 0 | 100 | |
| | | | Total LBS | 1000.00 |

Fig. 8

| PREFERRED BUNSTOCK FORMULATIONS ||||
|---|---|---|---|---|
| Component | PBW | Min | Max | Pounds |
| Isocyanate (MRP, Bayer) | 242.17 | 192 | 500 | 554.26 |
| Polyester Polyol (Kosa 2031 or Stepan 3152) | 100.00 | 75 | 125 | 228.87 |
| Expandable Graphite Particles < 200μ ave. size (Graph-Tech Inc) | 15.57 | 14 | 20 | 35.64 |
| Expandable Graphite Particles < 200μ ave. size (Graph-Tech Inc) or Carbon Black | 15.57 | 14 | 20 | 35.64 |
| Phosphate / Polymeric Phosphate, amine blends (Antiblaze 80, Albright&Wilson) | 15.00 | 10 | 25 | 34.33 |
| Brominated-Ester (Pelron) | 7.50 | 0 | 10 | 17.17 |
| Additional Fire Retardants | 22.5 | 10 | 35 | 51.5 |
| Halogenated Hydrocarbon (134-a, HFC, DuPont) | 3.50 | | 4.5 | 8.01 |
| Non-Halogenated Hydrocarbon (Iso-Pentane, Exxon) | 26.00 | 5.0 | 46 | 59.51 |
| Surfactant (84PI, Goldsmidth) | 2.50 | 1.5 | 4.5 | 5.72 |
| Dispersing Agent (Pelron 344) | 2.90 | 0 | 4.4 | 6.64 |
| Crosslinker (Epoxy Resin, Epon 828) | 3.79 | 2.0 | 4.5 | 8.67 |
| Trymer Catalyst (TMR-3, Air Products) Quarternary ammonium salt | 1.33 | 1.0 | 2.5 | 3.04 |
| DMEA, Amine | 0.55 | .25 | 1.0 | 1.25 |
| DEG, Glycol | 0.55 | .25 | 1.0 | 1.25 |
| Catalysts | 2.43 | 1.5 | 4.5 | 5.54 |
| Other Ingredients | 0 | 0 | 100 | 0 |
| | | | Total LBS | 1000.00 |

Fig. 9

FIRE RESISTANT FOAM AND FOAM PRODUCTS, METHOD AND DISPERSIONS FOR MAKING SAME

This application claims priority from U.S. Provisional Application No. 60/192,231, filed Mar. 27, 2000.

The present invention relates to foam and foam products having excellent fire resistance achieved through the use of expandable graphite. In particular, the foam is preferably made using small particles of expandable graphite and a non-halogenated hydrocarbon as a primary blowing agent in an extrusion process. In preferred embodiments, rigid polyisocyanurate foam is made with expandable graphite particles having an average particle size less than 200 microns which exhibits self extinguishing properties and good insulation qualities.

BACKGROUND

Foams and processes for their production are well known in the art. Such foams are typically produced by reacting ingredients such as a polyisocyanate with an isocyanate reactive material such as a polyol in the presence of a blowing agent.

Synthetic foams have many uses and are produced in many forms. Rigid foam insulation panels are used in the construction of buildings. Foam bun stock is used for freezer insulation. Flexible foam is used in the manufacture of automobiles and furniture. Shaped foam products are used for building facades and ornamental effects for both interior and exterior uses.

Foam products are generally highly flammable when made solely out of their basic components. A variety of materials have been used in the past for imparting fire resistance to foams. For example, standard liquid flame retardants such as TRIS (-chloro-2-propyl) phosphate products, commercially available as ANTI-BLAZE 80 from Albright and Wilson and as PCF from Akzo Nobel have been conventionally used to increase the fire resistance of the foam. Such additives can be used to produce Factory Mutual Class 1 rated foam when organic halogenated hydrocarbons, such as 1,1-dichloro-1-fluorethane (HCFC-141b) are used as the primary blowing agent. However, similar foams made with non-halogenated hydrocarbons, such as iso-pentane and/or cyclopentane, used as the primary blowing agent fail to produce Factory Mutual Class 1 rated foam.

The use of expandable graphite as a fire retardant for polymer foams is generally known through the teaching of U.S. Pat. No. 3,574,644. It has been shown that particle size has an impact on the effectiveness of expandable graphite as a fire retardant. For example, U.S. Pat. No. 5,169,876 teaches the effective use of expandable graphite in a flexible polyurethane foam with a particle size of 300 to 1000 microns, but that use of expandable graphite having a particle size of less than 200 microns is ineffective.

It is desirable to produce foam and foam products having improved fire resistance and/or self extinguishing characteristics. Since the use of certain halogenated hydrocarbons may have detrimental environmental effects, it is also desirable to provide foam made with a non-halogenated hydrocarbon as the primary blowing agent.

SUMMARY

A synthetic polymer foam is produced which incorporates fine particles of expandable graphite which surprisingly impart excellent fire resistant properties to the foam, particularly to foam made with a non-halogenated hydrocarbon as the primary blowing agent. For best results, the foam is produced through mixing the constituent materials, including the expandable graphite using a screw extruder. The foam can also be produced by creating a graphite/polyol or graphite/isocyanate dispersion in an extruder then mixing the remaining components in a conventional batch mixing or high pressure spraying process. Alternatively, conventional mixing can be used for the entire process, but use of a screw extruder in whole or in part is preferred.

Expandable graphite material having an average particle size of less than 200 microns, such as expandable graphite commercially available as GRAFGuard 160-80 (80 mesh, 177 microns) from UCAR Graph-Tech Inc., wherein sulfuric acid and nitric acid are encapsulated within the graphite can be used. A neutral grade of expandable graphite having a PH of at least 5, preferably 7, with an expansion threshold of 160° C., such as GRAFGuard 160-80 N, is preferred. Expandable graphite with very fine average particle size of 100 microns or less, such as GRAFGuard 160-150 N (150 mesh), can be used with a non-halogenated hydrocarbon blowing agent when employing an extruder to make rigid PUR/PIR foam. Preferably the foam formulation includes at least 1% loading of expandable graphite to produce a fire resistant foam and at least 3% loading to produce self extinguishing foam and foam products. When subjected to burning, the expandable graphite particles within the foam expand up to one hundred times the original diameter creating a graphite char that retains an excellent heat resistance in addition to providing self extinguishing properties.

Applicants have discovered that use of a unique combination of expandable graphite and carbon black produces an excellent foam product having both fire resistance and good insulating qualities, even where non-halogenated hydrocarbon blowing agents are employed in the manufacture of the foam.

It is an object of the present invention to provide foam and foam products having improved fire resistance.

It is a further object to provide various methods for making such foams including the use of an extruder and the use of non-halogenated hydrocarbon blowing agents.

It is a further object to employ small particle size expandable graphite and/or carbon black in the manufacture of such foam.

Other objects and advantages of the present invention will become apparent through a description of the presently preferred embodiments.

DETAILED DESCRIPTION OF THE PREFERRED EMBODIMENT(S)

Figure 1:
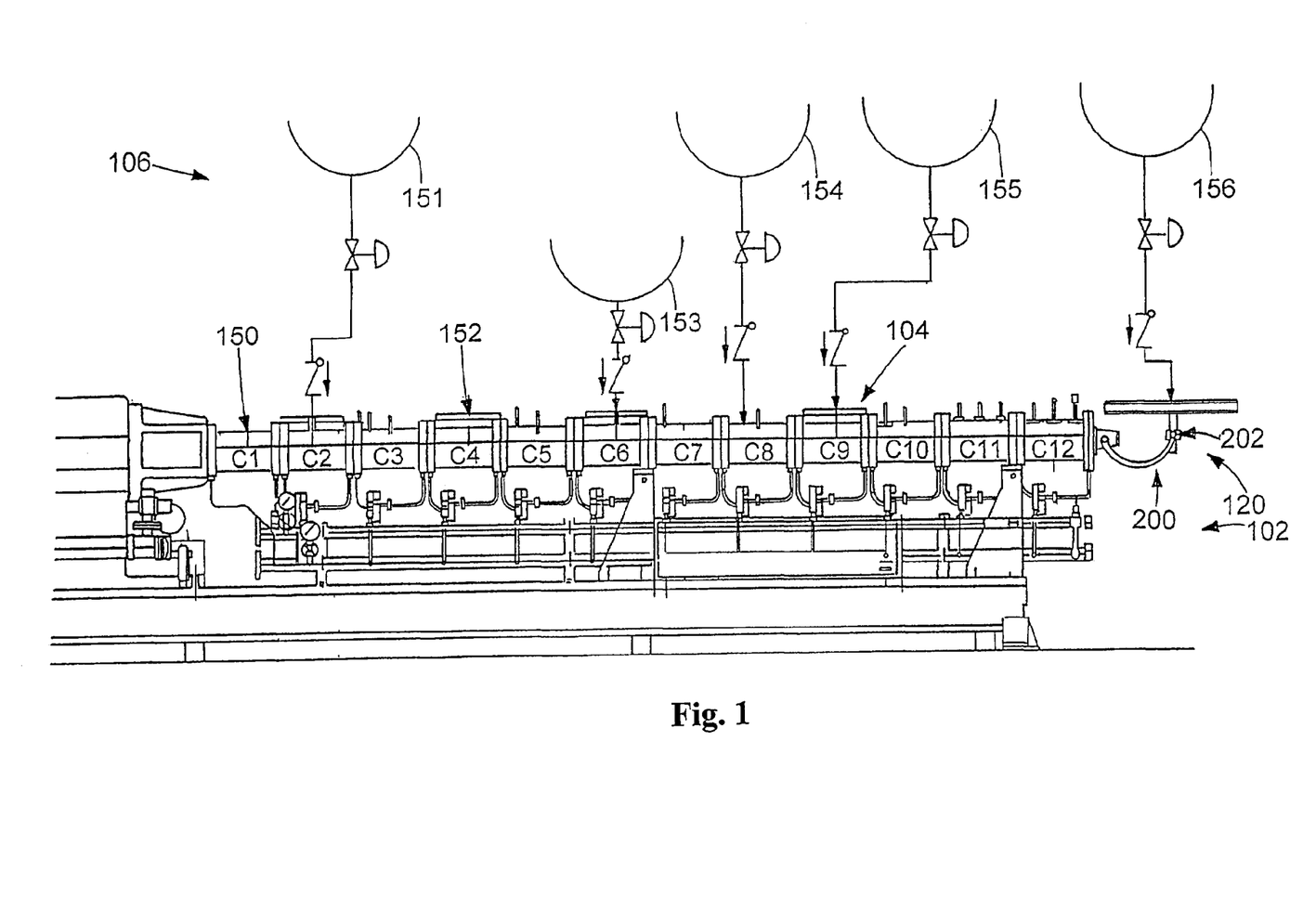
FIG. 1 is a schematic illustration of an apparatus for extruding polymer foam, or dispersions for use in making such foam, in accordance with the teachings of the present invention.

Foams in accordance with the present invention are preferably manufactured using an extruder, such as the extruder system 102 schematically illustrated in FIG. 1. The extruder can be used for the entire process or to make a dispersion of expandable graphite and/or carbon black which is then used to make foam using any mixing method. Use of the extruder provides the best results, but other conventional mixing methods may be used.

The extrusion system 102 includes a single or twin screw extruder 104 and an associated reservoir system 106. The extruder 104 includes a series of barrels C1-C12 and an extruder head 120. Preferably a twin screw extruder is employed such as described in U.S. Pat. No. 5,723,506 assigned to the assignee of the present invention.

The reservoir system 106 includes a plurality of reservoirs 150-156 from which the foam components are supplied. The reservoirs 150-156 feed the foam component materials to the barrels C1-C12 and head 120 of the extruder 104 via a network of feed lines and valves as illustrated.

In manufacturing foam using the extrusion system of FIG. 1, expandable graphite particles are preferably provided to the extruder 104 at barrel C1 from a fill station 150. Additional expandable graphite and/or carbon black is preferably provided to the extruder 104 at barrel C4 from a fill station 152. Isocyanate solution is preferably mixed and fed to barrels C2 and C6 of the extruder 104 from reservoirs 151 and 153. The isocyanate solution may be optionally pre-mixed with a dispersing agent and/or surfactant at reservoirs 151 and 153 and provided to the extruder 104 with the isocyanate at barrels C2 and C6.

Polyol is preferably provided from a reservoir 155 and fed to the extruder 104 at barrel C9. Surfactant, curing agent and foaming agent is preferably pre-mixed with the polyol contained in the reservoir 155 and fed to the extruder 104 at barrel C9.

Foaming and/or blowing agents are preferably provided from a reservoir 154 and fed to the extruder 104 at barrel C8 without previous mixing with other components. Additionally, foaming and/or blowing agents may be mixed with the polyol at reservoir 155 prior to entry to the extruder 104 at barrel C9. For example, foaming agent is provided to extruder 104 at barrel C9 after the foaming agent is first mixed with a polyol/surfactant mixture.

Figure 2:
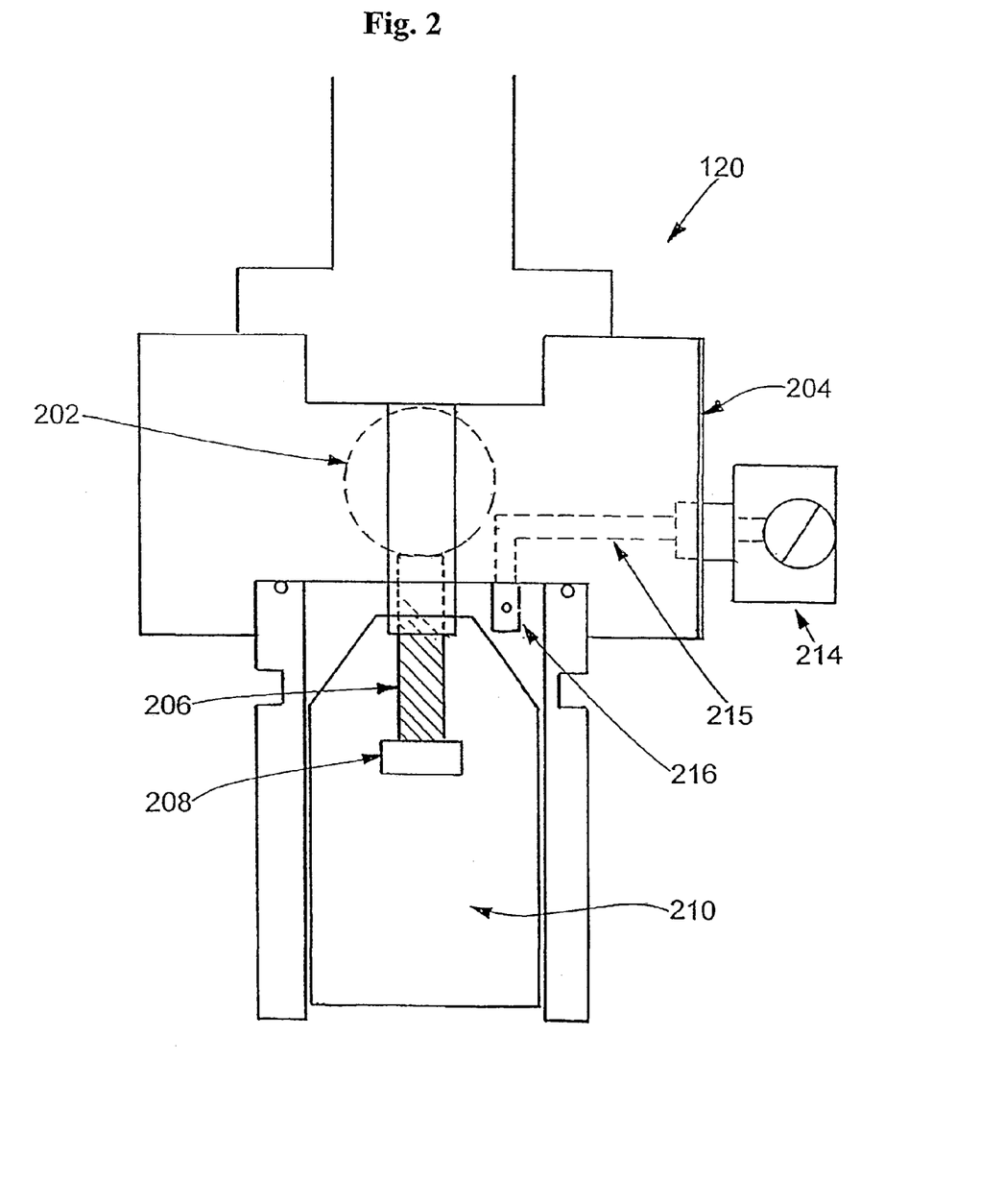
FIG. 2 is a cross-sectional side view of the extruder head of the extruder of FIG. 1.

Catalyst is preferably introduced into the extruder 104 via an extruder head 120 from reservoir 156. A cross-sectional side view of the extruder head 120 of the extrusion system is shown in FIG. 2.

In making foam, the mixture of the component parts of the graphite particles, isocyanate, polyol, and additional materials, without the catalyst, arrives via a hose 200 (shown in FIG. 1) to an entry port 202 in a mixing block 204 of the extruder head 120. At mixing block 204, the component mixture travels via a worm gear 206 to agitator 208 located in a cavity area 210. Concurrently, catalyst enters at a catalyst port 214 and travels along a duct 215 to arrive in the cavity area 210 via a catalyst entry port 216. The mixture of the component parts of the expandable graphite isocyanate, polyol and additional agents and catalyst are mixed together by agitator 208 in the cavity area 210 and continues out of the cavity area 210, preferably onto a conveyor system such as the conveyor illustrated in U.S. Pat. No. 5,723,506. Preferably, the cavity 210 is 2 to 3 inches wide and the agitator is rotated at approximately 3500 to 5500 rpm.

A preferred method of manufacturing foam using the extruder of FIG. 1 includes feeding graphite particles and/or carbon-black from source 150 to the extruder 104 at barrel C1. A mixture of isocyanate, dispersing agent and surfactant is fed to the extruder 104 at barrel C2 from reservoir 151. Additional graphite particles and/or carbon-black may be added from source 152 and fed to the extruder 104 at barrel C4 particularly, when loading of the graphite particles and/or carbon-black is to exceed 12-15%. An additional mixture of isocyanate, dispersing agent and surfactant is then added to the extruder 104 at barrel C6 from reservoir 153. Blowing agent is provided to the extruder 104 at barrel C8 from reservoir 154. Polyol, foaming and blowing agent, surfactant and curing agent are fed to the extruder 104 at barrel C9 from reservoir 155. Finally, a catalyst or catalyst mixture is provided to the extruder head 120 from reservoir 156.

A preferred method of manufacturing an isocyanate dispersion in accordance with the teachings of the present invention using the extruder of FIG. 1 includes feeding graphite particles and/or carbon black from source 150 to the extruder 104 at barrel C1. A mixture of isocyanurate and dispersing agent, optionally with surfactant, is fed to the extruder 104 at barrel C2 from reservoir 151. Additional graphite particles and/or carbon black may be added from reservoirs 152 and fed to the extruder 104 at barrel C4. An additional mixture of isocyanurate and dispersing agent, optionally with surfactant, may then be added to the extruder 104 at barrel C6 from reservoir 153. No polyol or catalyst materials are added to the extruder and the resultant dispersion exits the extruder at the last barrel C12 and is preferably directed into an appropriate container, bypassing the extruder head 202.

A preferred method of manufacturing a polyol dispersion in accordance with the present invention using the extruder of FIG. 1 includes feeding graphite particles and/or carbon black from source 150 and/or source 152 to the extruder 104 at barrel C1 and/or barrel C4. A mixture of polyol and a dispersing agent optionally with foaming agent, blowing agent, surfactant and/or curing agent, is fed to the extruder 104 at barrel C9 from reservoir 155. The polyol dispersion exits the extruder at barrel C12, preferably directly into an appropriate container, bypassing the extruder head 202.

The production of foams based on isocyanates is known per se and is described, for example, in German Offenlegungsschriften 1,694,142, 1,694,215 and 1,720,768, as well as in Kunststoff-Handbuch [Plastics Handbook], Volume VII, Polyurethane, edited by Vieweg and Hochtlen, Carl Hanser Verlag, Munich 1966, and in the new edition of this tome, edited by G. Oertel, Carl Hanser Vedag, Munich, Vienna, 1983.

These foams are mainly those that comprise urethane and/or isocyanurate and/or allophanate and/or uretdione and/or urea and/or carbodiimide groups. Preferred starting components include aliphatic, cycloaliphatic, araliphatic, aromatic and heterocyclic polyisocyanates, such as those described, for example, by W. Siefken in Justus Liebigs Annalen der Chemie, 562, pp. 75-136, for example, those of the formula $$Q(NCO)_n$$

in which n denotes 2-4, preferably 2-3, and Q denotes an aliphatic hydrocarbon radical of 2-18, preferably 6-10 carbon atoms, a cycloaliphatic hydrocarbon radical of 4-15, preferably 5-10 carbon atoms, an aromatic hydrocarbon radical of 6-15, preferably 6-13 carbon atoms or an araliphatic hydrocarbon radical of 8-15, preferably 8-13 carbon atoms, for example, such polyisocyanates as described in DE-OS 2,832,253, pp. 10-11.

Particularly preferred are usually those polyisocyanates which are technically readily accessible, for example, the 2,4- and 2,6-toluylene diisocyanate as well as any mixture of these isomers ("TDI"); polyphenyl5 polymethylenepolyisocyanates, such as those obtained by an aniline formaldehyde condensation and subsequent treatment with phosgene ("crude MDI"), and polyisocyanates comprising carbodiimide groups, urethane groups, allophanate groups, isocyanurate groups, urea groups or biuret groups ("modified polyisocyanates"), especially those modified polyisocyanates which are derived from 2,4- and/or 2,6-toluylene diisocyanate and from 4,4'- and/or 2,4'-diphenylmethane diisocyanate.

The starting components may further be compounds of a molecular weight usually of 400 to 10,000, containing at least two hydrogen atoms reactive toward isocyanates. These comprise, besides compounds containing amino, thio, or carboxyl groups, preferably compounds containing hydroxyl groups, in particular compounds containing 2 to 8 hydroxyl groups, especially those of a molecular weight of 1,000 to 6,000, preferably 2,000 to 6,000, for example polyethers and polyesters as well as polycarbonates and polyester amides containing at least 2, usually 2 to 8, preferably 2 to 6 hydroxyl groups; these compounds are known per se for the preparation of homogenous and cellular polyurethanes and are disclosed, for example in DE-OS 2,832,253, pp. 11-18.

When appropriate, compounds comprising at least two hydrogen atoms reactive toward isocyanates and of a molecular weight of 32 to 399 may be used as further starting components. Also, in this case, compounds containing hydroxyl groups and/or amino groups and/or thiol groups and/or carboxyl groups, preferably compounds containing hydroxyl groups and/or amino groups, are understood to be those which are used as chain lengtheners or crosslinking agents. These compounds usually have 2 to 8, preferably 2 to 4 hydrogen atoms reactive toward isocyanates. Appropriate examples are disclosed in DE-OS 2,832,253, pp. 19-20. Other examples of polyisocyanates and polyols useful in the invention are described in U.S. Pat. No. 5,149,722, co-owned by the assignee of the present invention and incorporated herein by reference as if fully set forth.

Blowing agents which may be used to make foam include water and/or readily volatile inorganic or organic substances and other auxiliary volatile blowing agents typically used to blow PUR/PIR foams. Water, however, used in small quantities serves as a foaming agent where other blowing agents are used.

Organic blowing agents include acetone, ethylacetate; halogen-substituted alkanes, such as methylene chloride, chloroform, ethylidene chloride, vinylidene chloride, monofluoro trichloromethane, chlorodifluoromethane, dichlorodifluoromethane, dichlorodifluoroethane, dichlorotrifluoroethane; also halogenated and non-halogenated hydrocarbon blowing agents.

Specific examples of non-halogenated hydrocarbon blowing agents include: pentane, butane, hexane, heptane, diethyl ether, isopentane, n-pentane and cyclopentane.

Specific examples of halogenated hydrocarbon blowing agents include: 1,1,1,4,4,4-hexafluorobutane (HFC-356); 1,1-dichloro-1 fluoroethane (HFC-141/b); the tetrafluoroethanes such as 1,1,1,2-tetrafluoroethane (HFC-134a); the pentafluoropropanes such as 1,1,2,2,3 pentafluoropropane (HFC-245ca), 1,1,2,3,3-pentafluoropropane (HFC 245ea), 1,1,1,2,3-pentafluoropropane (HFC-245eb), and 1,1,1,3,3 pentafluoropropane (HFC-245fa); the hexafluoropropanes such as 1,1,2,2,3,3-hexafluoropropane (HFC-236ca), 1,1,1,2,2,3-hexafluoro propane (HFC-236cb), 1,1,1,2,3,3-hexafluoro-propane (HFC-236ea), 1,1,1,3,3,3-hexafluoro-propane (HFC-236fa); the pentafluorobutanes such as 1,1,1,3,3-pentafluorobutane (HFC-365); and difluoroethanes such as 1,1-difluoroethane (HFC-152a).

Inorganic blowing agents are, for example, air, $CO_2$ or $N_2O$. A blowing effect may also be obtained by adding compounds which decompose at temperatures above room temperature giving off gases, such as azodicarbonamide or azoisobutyronitrile. Other examples of blowing agents may be found in Kunststoff-Handbuch, Vol. VII, by Vieweg and Hochtlen, Carl-Hanser Verlag, Munich, 1966, on pages 108 and 109, 453 to 455 and 507 to 510.

Different types of blowing agents are used in combination, but use of a non-halogenated hydrocarbon chemical as the primary blowing agent has generally been avoided due to the flammability of foams which conventionally result. Use of expandable graphite as taught by the present invention permits the use of a non-halogenated primary blowing agent in the production of foam which is rated as Factory Mutual Class 1 when tested using test method ASTM E84.

When appropriate, other auxiliary agents and additives may be used at the same time, such as:

water and/or other highly volatile organic substances as propellants, i.e. foaming agents;

additional catalysts of the type known per se in amounts up to 10% by weight of the polyol component;

surface-active additives, such as emulsifiers and foam stabilizers, and reaction retardants, for example acidic substances such as hydrochloric acid or organic acid halides, also cell regulators of the type known per se, such as paraffins or fatty alcohols or dimethylpolysiloxanes, as well as, pigments or dyes and other flame retardants of the type known per se, for example tricresyl phosphate, also stabilizers against the effect of aging and weathering, plasticizers and fungistats and bacteriostats as well as fillers such as barium sulphate, kieselguhr, carbon black, expanded or expandable microspheres or whiting.

Other examples of surface active additives, foam stabilizers, cell regulators, reaction retardants, stabilizers, flame retardants, plasticizers, dyes, fillers, fungistats, bacteriostats to be used at the same time if appropriate, as well as details concerning the use and action of these additives are described in Kunststoff-Handbuch [Plastics Handbook], Volume VII, edited by Vieweg and Hochtlen, Carl Hanser Verlag, Munich 1966, for example on pages 103-113.

Figure 3:
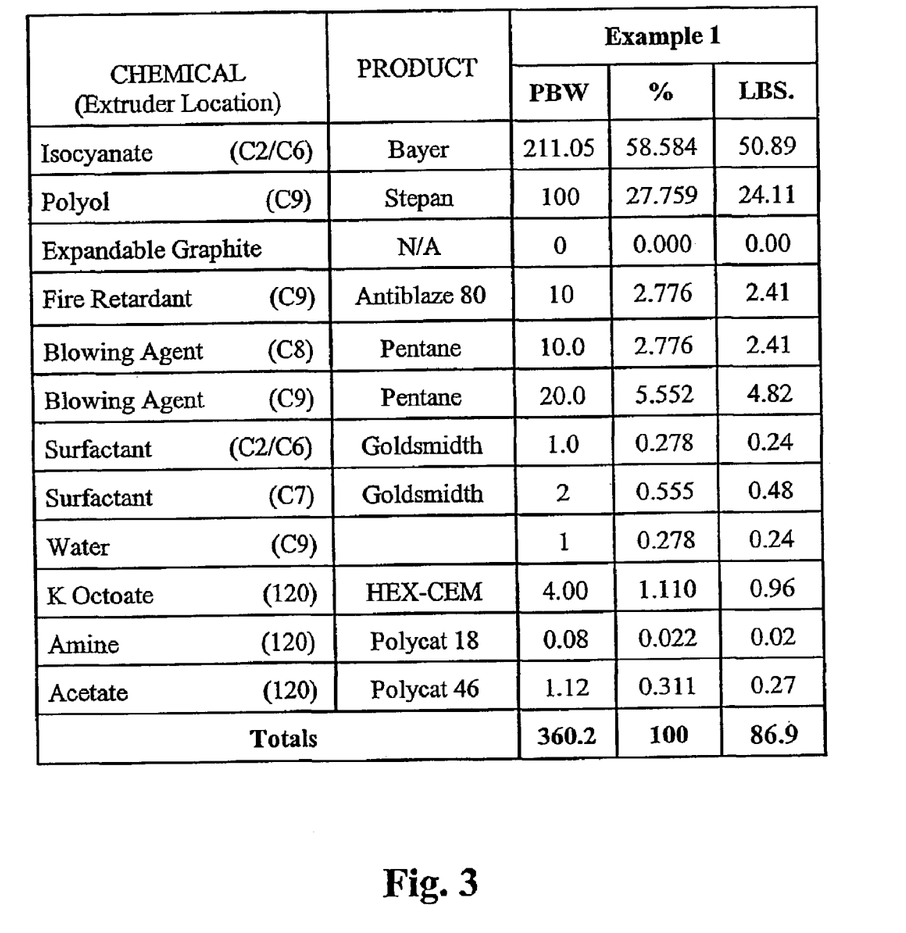
FIG. 3 is a table reflecting a control example made without expandable graphite and with a non-halogenated hydrocarbon blowing agent.
Figure 4:
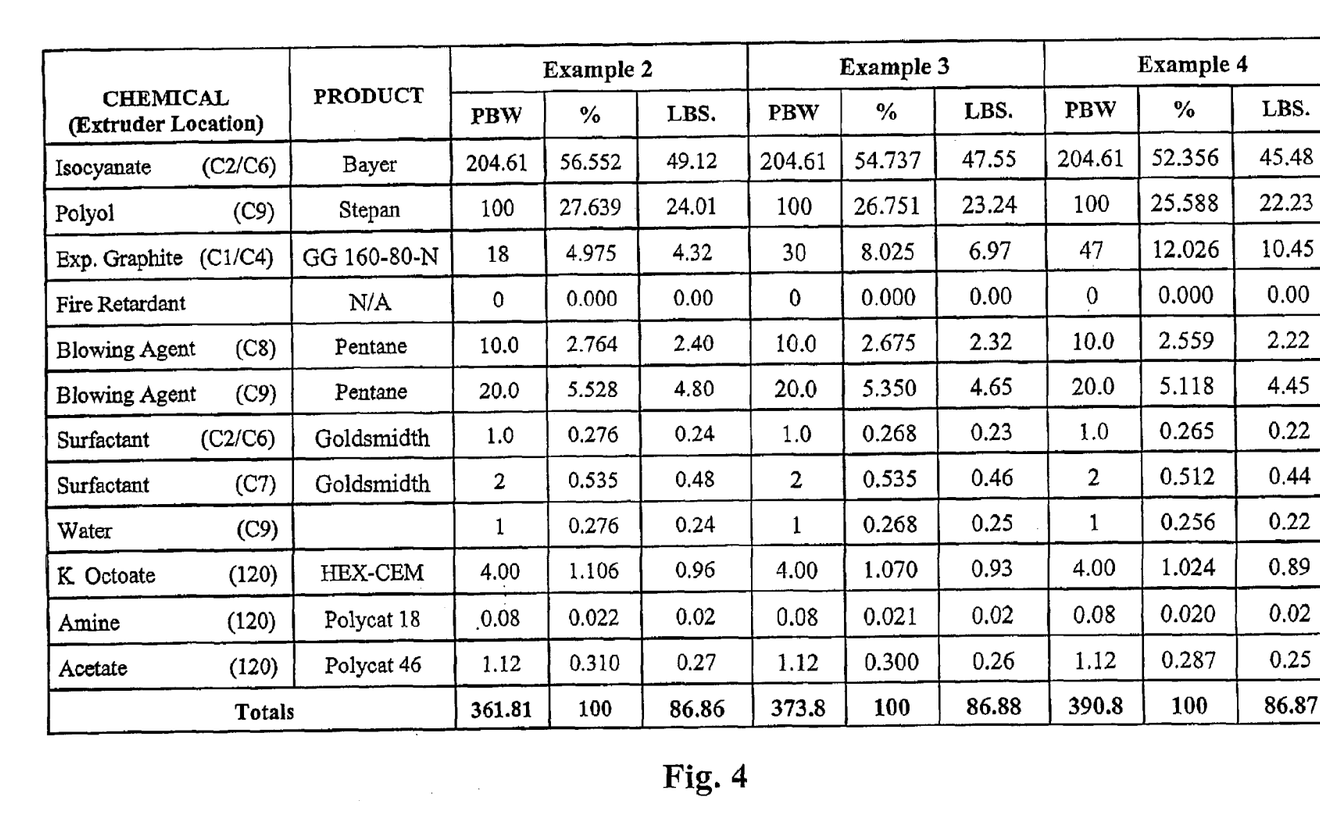
FIG. 4 is a table of three foam examples made in accordance with the teachings of the present invention.
Figure 5:
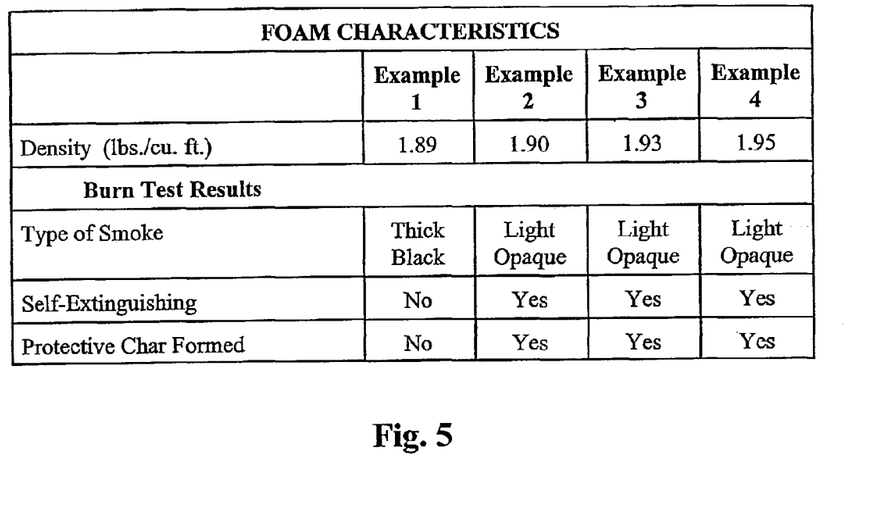
FIG. 5 is a table reflecting foam characteristics of the examples set forth in FIGS. 3 and 4.

FIGS. 3-5 reflect various foams, Examples 1-4, made in accordance with the extrusion method recited above. A non-halogenated hydrocarbon blowing agent, pentane, was the blowing agent used in all Examples 1-4.

Example 1 reflects a control example with no expandable graphite material. By comparison, the other examples were made with differing amounts of expandable graphite having an average particle size of less than 200 microns. Burn tests were performed with the control foam, Example 1, and expandable graphite foams, Examples 2-4. Thickness and weight loss examples were measured.

Visually, polyisocyanurate foam made with the non-halogenated blowing agent and a 5% loading or higher of expandable graphite, Examples 2-4, produced no noticeable black smoke as with polyisocyanurate made with the non-halogenated blowing agent and a standard liquid flame retardant, Example 1. There was no significant density increase using expandable graphite in the range of 5%-12%. There was also considerably less flame spread noticed during the burn with 5% or more of graphite particles.

Based on the test results, it was determined that fire retardant foams can be produced by providing 1% to 50% by weight evenly dispersed expandable graphite particles which have an average particle size of less than 200 microns. Moreover, the use of such expandable graphite in a preferred range of 3%-20% by weight can produce a class 1 rated foam per Factory Mutual Standard F.M. 4450 and Underwriters Laboratories Standard UL1256 when tested using test method ASTM E84.

Figure 6:
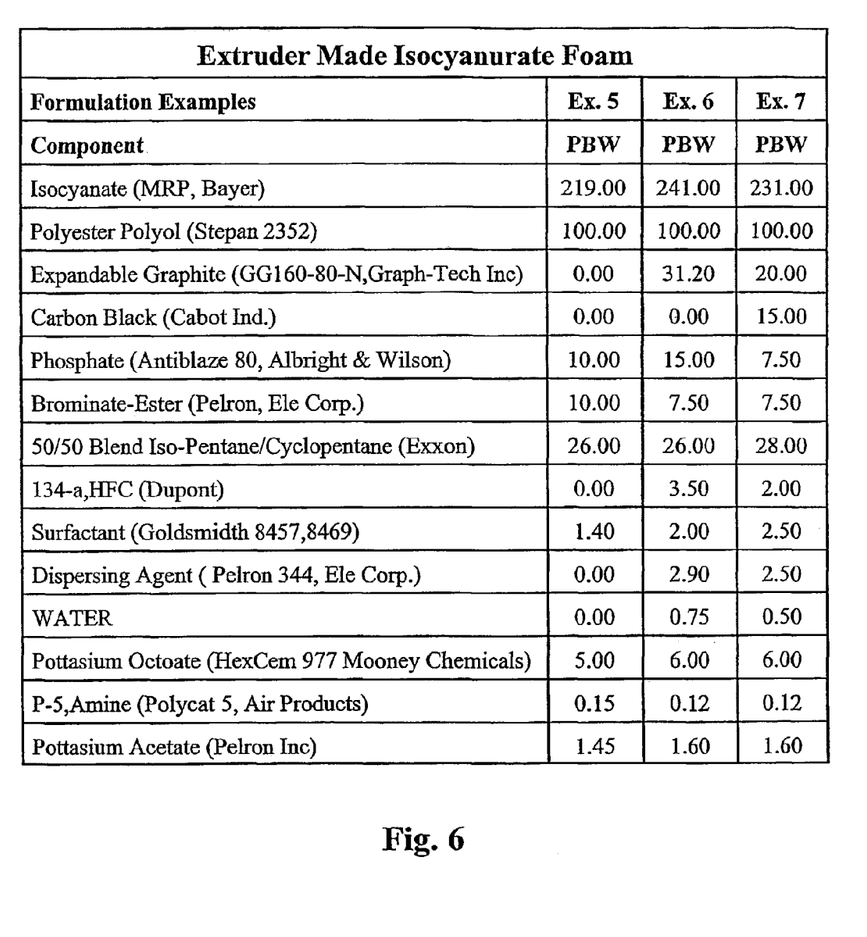
FIG. 6 is a table reflecting additional examples of extruder made isocyanurate foam reflecting control Example 5 and Examples 6 and 7 made in accordance with the teachings of the present invention.
Figure 7:
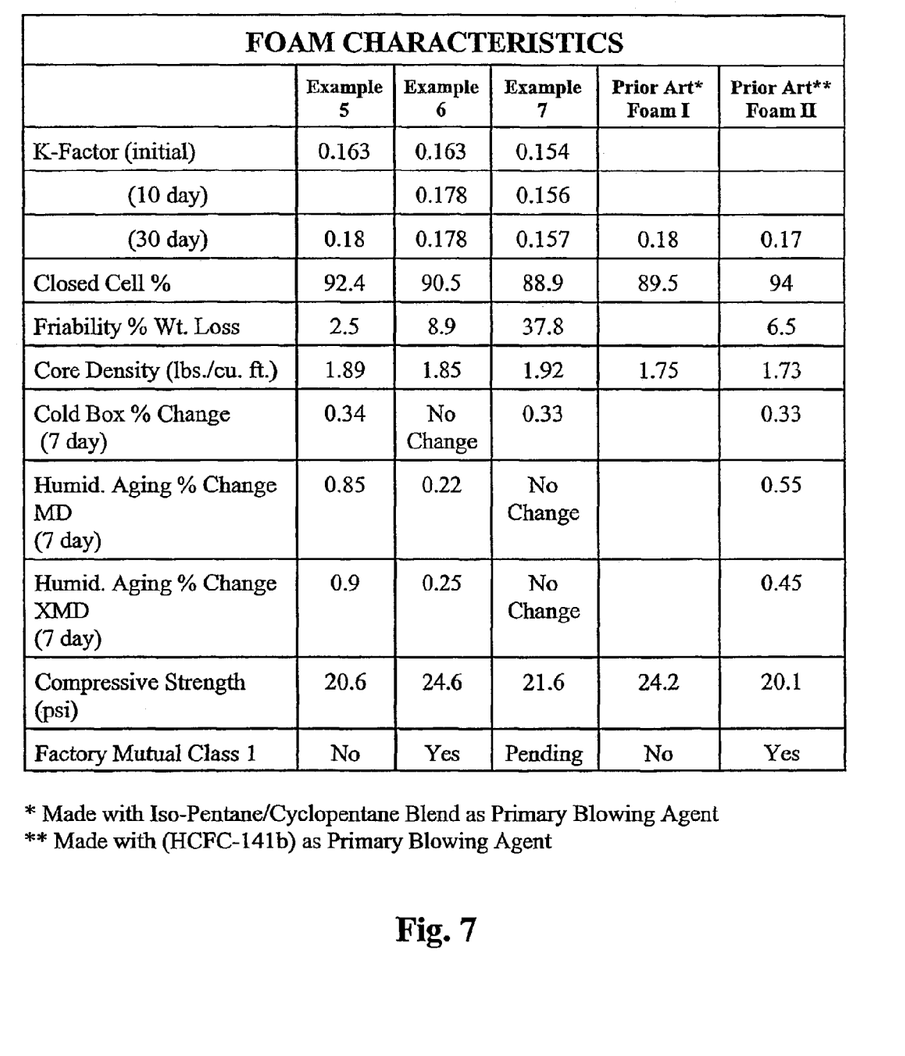
FIG. 7 is a table reflecting foam characteristics of the examples set forth in FIG. 6 in comparison with additional prior art examples.

Tables 6-7 reflect an additional comparative analysis, Examples 5-7, of a control versus two example foams made in accordance with the teachings of the present invention. Control Example 5 contained no expandable graphite. Example 6 contained expandable graphite and Example 7 contained a combination of expandable graphite and carbon black. In all cases, the primary blowing agent was a non-halogenated hydrocarbon chemical. Less than 1% of a halogenated hydrocarbon co-blowing agent and less than 1% water serving as a foaming agent were used in Examples 6 and 7.

As reflected in Table 7, the foam made in accordance with Example 7 had the best K factor and was otherwise comparable to prior art commercial foam, Foam II, made with a halogenated hydrocarbon blowing agent. The foam made in accordance with Example 6 had a K factor better than the prior art competitive foam, Foam I, made with a non-halogenated primary blowing agent, but not quite as good as the prior art foam, Foam II, made with a non-halogenated primary blowing agent. However, unlike the prior art foam made with a non-halogenated primary blowing agent, Foam I, the Example 6 foam passed Factory Mutual Standard F.M. 4450 and Underwriter's Laboratory Standard UL1256 for a Class 1 rating when tested in accordance with Test Method ASTM E84.

Based on the results of Examples 2, 3, 4 and 6, it is believed that the Example 7 foam will also be accorded a Factory Mutual Class 1 rating when independently tested in accordance with Test Method ASTM E84.

Figure 8:
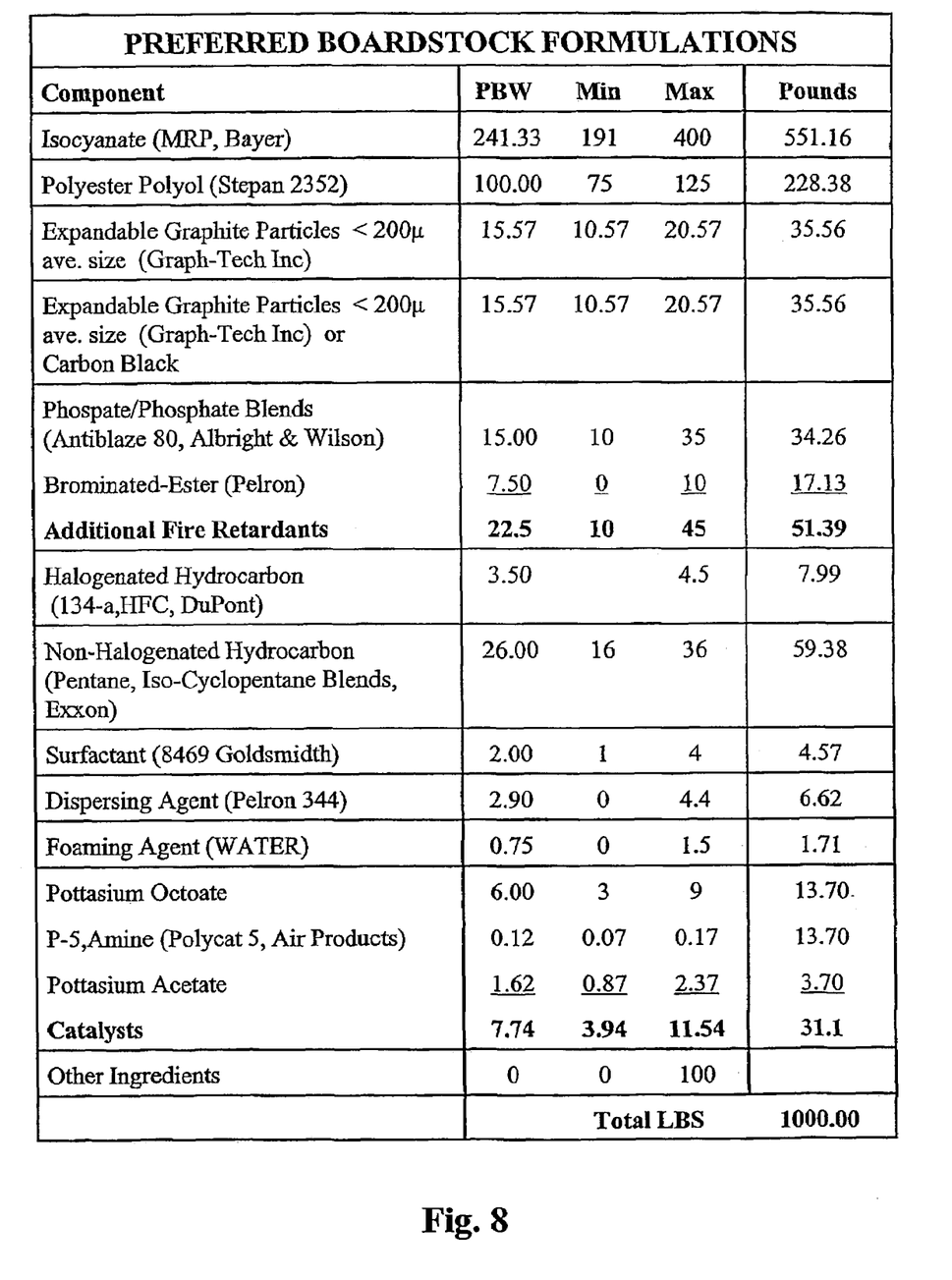
FIG. 8 is a table of preferred boardstock formulations.
Figure 9:
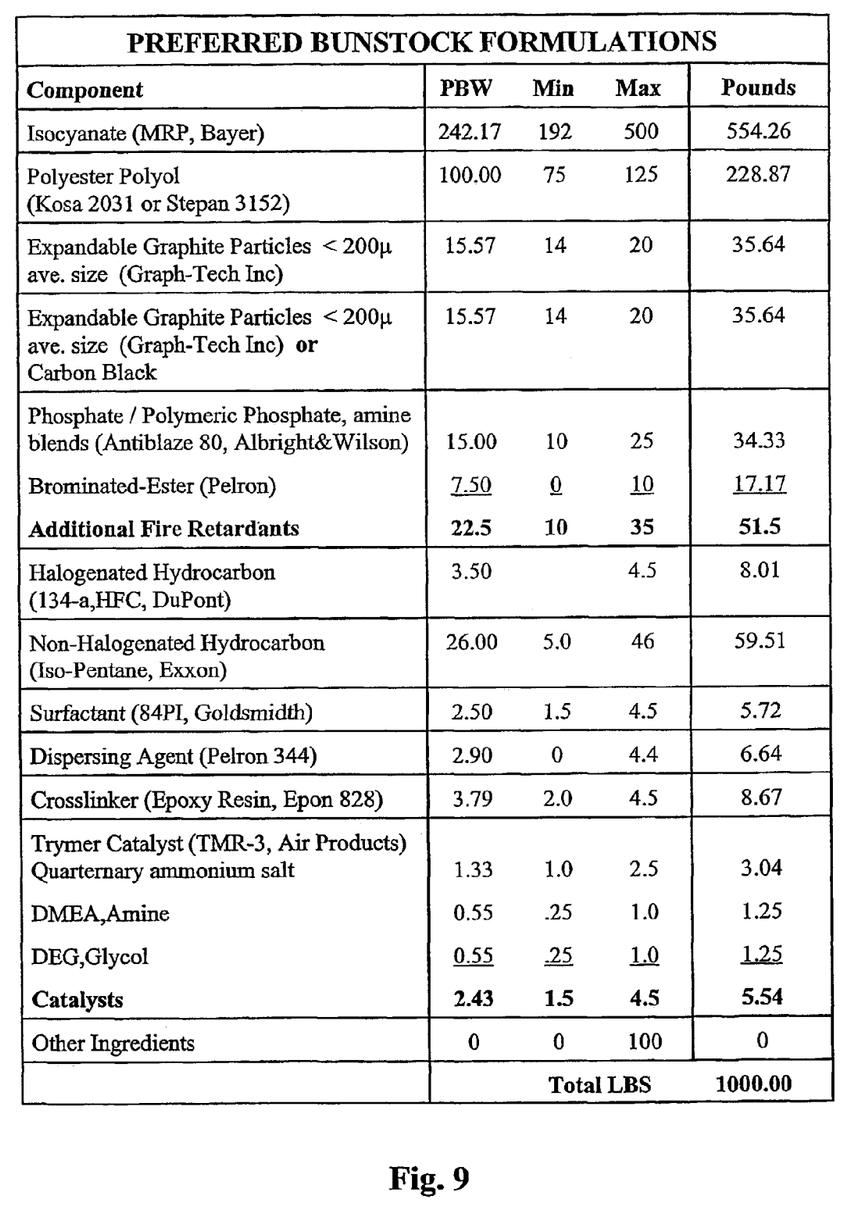
FIG. 9 is a table of preferred bunstock formulations.

In accordance with the experimentation and testing performed by the present inventors, preferred formulations for the manufacturer of PUR/PIR boardstock and bunstock are set forth in FIGS. 8 and 9, respectively. While prefered types and/or sources of the component materials are identified, these are non-limiting examples. Various other additive materials as discussed above, preferably not exceeding 100 parts by weight, may be added to the formulations set forth in FIGS. 8 and 9. These PIR/PUR foam formulations are primarily characterized in the use of at least 3% expandable graphite preferably having an average particle size less than 200 microns, the use of a non-halogenated hydrocarbon chemical or blend as the primary blowing agent, and the use of less than 1% of a halogenated blowing agent. The use of at least 4.5% expandable graphite and 3.5% carbon black can produce a class 1 rated foam per Factory Mutual Standard F.M. 4450 and Underwriters Laboratories Standard ULL1256 when tested using test method ASTM E84.

Preferably, the components are combined by the use of an extruder as set forth above. Alternatively, the components can be mixed utilizing other methods. Where conventional mixing is employed, it is preferred to create either a polyol or isocyanate dispersion with the expandable graphite and optionally carbon black which is then used to make foam in accordance with the formulations set forth in FIGS. 8 and 9.

Figure 10:
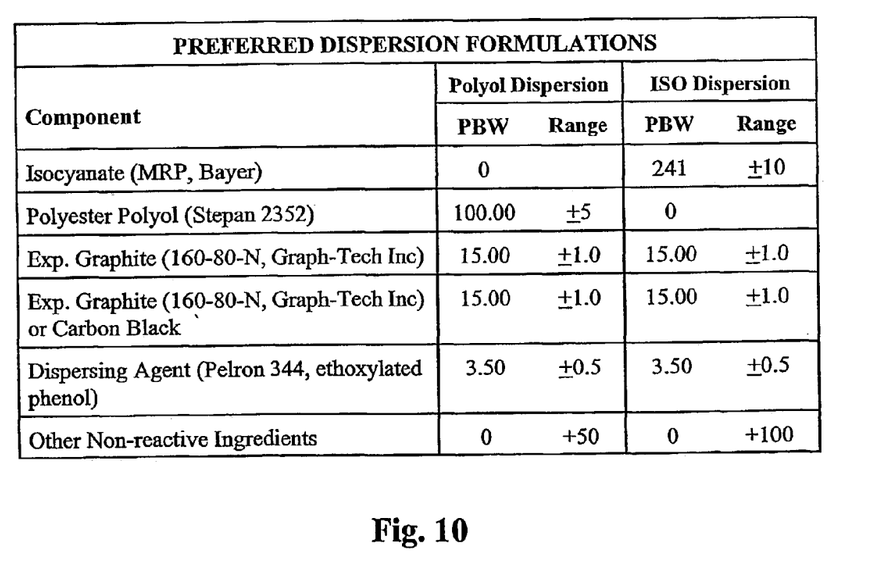
FIG. 10 is a table of preferred dispersion formulations.

FIG. 10 sets forth preferred dispersion formulations in this regard. Dispersions so made can be stored and/or shipped to other locations with minimal effect on the uniformity of the distribution of the expandable graphite particles in the dispersion. This permits a single extruder to supply many batch processing facilities to make foam in accordance with one of the preferred methods taught by the present invention.

What is claimed is:

1. A rigid polyurethane and/or polyisocyanurate foam having fire resistance comprising:
   from 1-50% by weight of evenly dispersed expandable graphite particles having an average particle size less than 200 microns,
   from 99 to 50% by weight of a closed cell polyurethane foam, and
   a non-halogenated chemical or non-halogenated chemical blend selected from the group consisting of pentane, butane, hexane, heptane, diethyl ether, isopentane, n-pentane and cyclopentane or blends of chemicals from said group as a primary blowing agent such that the foam passes the burning test of Factory Mutual Standard F.M. 4450, Underwriters Laboratories standard UL 1256 and ASTM E84 for class 1 ratings under each test standard.

2. A rigid polyurethane or polyisocyanurate foam according to claim 1 wherein the expandable graphite particles comprise 3 to 20% by weight of the foam and have a PH greater than 5.

3. A rigid polyurethane or polyisocyanurate foam according to claim 1 having at least 4.5% by weight expandable graphite particles and at least 3.5% by weight carbon black.

4. The foam according to claim 2 wherein the expandable graphite particles are GRAFguard 160-80-N expandable graphite.

5. A rigid polyurethane and/or polyisocyanurate foam made according to claim 1 by mixing:
   10.57 to 41.14 PBW expandable graphite particles having an average particle size less than 200 microns;
   191 to 400 PBW isocyanate;
   75 to 125 PBW polyol;
   16 to 36 PBW of a the non-halogenated chemical or non-halogenated chemical blend as the primary blowing agent;
   0 to 20.57 PBW of carbon black; and
   19 to 165 PBW other ingredients with less than 1% by weight of halogenated blowing agents.

6. A rigid polyurethane and/or polyisocyanurate foam made according to claim 1 by mixing:
   14 to 40 PBW expandable graphite particles having an average particle size less than 200 microns;
   192 to 500 PBW isocyanate;
   75 to 125 PBW polyol;
   5 to 46 PBW of the non-halogenated chemical or non-halogenated chemical blend as the primary blowing agent;
   0 to 20 PBW of carbon black; and
   20 to 155 PBW other ingredients with less than 1% by weight of halogenated blowing agents.

7. A method for facilitating the manufacture of fire resistant polyurethane and/or polyisocyanurate foam that passes the burning test of Factory Mutual Standard F.M. 4450, Underwriters Laboratories standard UL 1256 and ASTM E84 for class 1 ratings under each test standard comprising:
   introducing 10.57 to 41.14 PBW expandable graphite particles having an average particle size less than 200 microns to the screw of an extruder;
   introducing at least 2 PBW of a dispersing agent to the screw of the extruder;

introducing 5 to 46 PBW of a non-halogenated chemical or a non-halogenated chemical blend selected from the group consisting of pentane, butane, hexane, heptane, diethyl ether, isopentane, n-pentane and cyclopentane or blends of chemicals from said group as a primary blowing agent to the screw of the extruder; and using the screw of the extruder to mix the expandable graphite particles, dispersing agent, and non-halogenated chemical or non-halogenated chemical blend with either 191 to 500 PBW of a isocyanate or 75 to 125 PBW of a polyol.

8. The method of claim 7 wherein 95 to 105 PBW of polyol are introduced to the screw of the extruder; 14 to 32 PBW of the expandable graphite particles are introduced to the screw of the extruder; 0 to 16 PBW of carbon black is introduced to the screw of the extruder; 3 to 4 PBW of the dispersing agent is introduced to the screw of the extruder; and 0 to 50 PBW of other non-reactive ingredients are introduced to the screw of the extruder to produce a polyol dispersion.

9. The method according to claim 7 wherein 231 to 251 PBW of isocyanate is introduced to the screw of the extruder; 14 to 32 PBW of the expandable graphite particles are introduced to the screw of the extruder; 0 to 16 PBW of carbon black is introduced to the screw of the extruder; and 3 to 4 PBW of the dispersing agent is introduced to the screw of the extruder extruder; and 0 to 100 PBW of other non-reactive ingredients are introduced to the screw of the extruder to produce an isocyanate dispersion.

10. The method according to claim 7 wherein:
10.57 to 41.14 PBW of expandable graphite particles having an average particle size less than 200 microns are introduced to the screw of the extruder;
191 to 400 PBW of isocyanate is introduced to the screw of the extruder;
75 to 125 PBW of polyol is introduced to the screw of the extruder;
16 to 36 PBW of the non-halogenated chemical or a non-halogenated chemical blend as the primary blowing agent is introduced to the screw of the extruder;
0 to 20.57 PBW of carbon black are introduced to the screw of the extruder; and
19 to 165 PBW other ingredients with less than 1 PBW of halogenated blowing agents are introduced to the screw or an extrusion head of the extruder to produce rigid foam boardstock.

11. The method according to claim 7 wherein:
14 to 40 PBW of expandable graphite particles having an average particle size less than 200 microns are introduced to the screw of the extruder;
192 to 500 PBW isocyanate to is introduced to the screw of the extruder;
75 to 125 PBW polyol is introduced to the screw of the extruder;
5 to 46 PBW of the non-halogenated chemical or non-halogenated chemical blend as the primary blowing agent is introduced to the screw of the extruder;
0 to 20 PBW of carbon black is introduced to the screw of the extruder; and 0 to 155 PBW other ingredients with less than 1% by weight of a halogenated blowing agent are introduced to the screw or an extrusion head of the extruder to produce rigid foam bunstock.

12. A rigid polyurethane and/or polyisocyanurate foam made with a non-halogenated hydrocarbon or diethyl ether chemical or non-halogenated hydrocarbon or diethyl ether chemical blend as a primary blowing agent having fire resistance comprising:
from 99 to 50% by weight of a closed cell polyurethane foam, and
from 1-50% by weight of evenly dispersed expandable graphite particles having an average particle size less than 200 microns, such that the foam passes the burning test of Factory Mutual Standard F.M. 4450 per ASTM E84 testing procedures for a class 1 rating.

13. The foam according to claim 12 wherein the primary blowing agent is selected from the group consisting of pentane, butane, hexane, heptane, diethyl ether, isopentane, n-pentane and cyclopentane or blends of chemicals from said group.

14. A rigid polyurethane or polyisocyanurate foam according to claim 12 wherein the expandable graphite particles comprise 3 to 20% by weight of the foam and have a PH greater than 5.

15. A rigid polyurethane or polyisocyanurate foam according to claim 12 having at least 4.5% by weight expandable graphite particles and at least 3.5% by weight carbon black.

16. The foam according to claim 12 wherein the expandable graphite particles are GRAFguard 160-80-N expandable graphite.

17. A rigid polyurethane and/or polyisocyanurate foam made according to claim 12 by mixing:
10.57 to 41.14 PBW expandable graphite particles having an average particle size less than 200 microns;
191 to 400 PBW isocyanate;
75 to 125 PBW polyol;
16 to 36 PBW of the non-halogenated chemical or non-halogenated chemical blend as the primary blowing agent;
0 to 20.57 PBW of carbon black; and
19 to 165 PBW other ingredients with less than 1% by weight of halogenated blowing agents.

18. A rigid polyurethane and/or polyisocyanurate foam made according to claim 12 by mixing:
14 to 40 PBW expandable graphite particles having an average particle size less than 200 microns;
192 to 500 PBW isocyanate;
75 to 125 PBW polyol;
5 to 46 PBW of the non-halogenated chemical or non-halogenated chemical blend as the primary blowing agent;
0 to 20 PBW of carbon black; and
20 to 155 PBW other ingredients with less than 1% by weight of halogenated blowing agents.

* * * * *